US008160779B2

(12) United States Patent  (10) Patent No.: US 8,160,779 B2
Thimar  (45) Date of Patent: Apr. 17, 2012

(54) MONITORING DEVICE FOR THE FUNCTION OF AN ELECTRONIC CONTROL DEVICE, AND METHOD FOR THIS PURPOSE

(75) Inventor: Zoltan Thimar, Budapest (HU)

(73) Assignee: Thuyssenkrupp Presta AG, Eschen (LI)

( * ) Notice: Subject to any disclaimer, the term of this patent is extended or adjusted under 35 U.S.C. 154(b) by 844 days.

(21) Appl. No.: 12/294,537

(22) PCT Filed: Mar. 2, 2007

(86) PCT No.: PCT/CH2007/000110
§ 371 (c)(1),
(2), (4) Date: Oct. 20, 2008

(87) PCT Pub. No.: WO2007/112603
PCT Pub. Date: Oct. 11, 2007

(65) Prior Publication Data
US 2010/0235055 A1  Sep. 16, 2010

(30) Foreign Application Priority Data
Apr. 3, 2006  (CH) .......................... 549/06

(51) Int. Cl.
G06F 7/00  (2006.01)
(52) U.S. Cl. ......................................... 701/43

(58) Field of Classification Search .................... 701/29, 701/31, 33–37, 41, 43, 29.1; 702/182; 714/49, 714/E11.024, E11.025
See application file for complete search history.

(56) References Cited

FOREIGN PATENT DOCUMENTS
EP  1205373  *  5/2002
* cited by examiner

Primary Examiner — Kim T Nguyen
(74) Attorney, Agent, or Firm — Nataro, Michalos & Zaccaria P.C.

(57) ABSTRACT

A control system for fault detection with a control device including a processor having a control program that calculates at least one actuating value signal outputted to an actuator. At two process points in the control program, at least one control point (K) is defined at which a program output value is outputted to form a monitoring signal that is outputted to a monitoring device. The monitoring signal contains at least two signal elements of three possible signal elements. A first signal element represents the control point through which the control program should have directly run before the control point, a second signal element represents the present control point, and a third signal element represents the next control point in the program process. The monitoring device checks the monitoring signals for the correct state, and a state signal can be output as a fault signal.

10 Claims, 10 Drawing Sheets

MONITORING DEVICE FOR THE FUNCTION OF AN ELECTRONIC CONTROL DEVICE, AND METHOD FOR THIS PURPOSE

FIELD AND BACKGROUND OF THE INVENTION

The invention relates to a control system with a control device including a processor and a control program as well as to a method for monitoring a control program of a control system with a control device including a processor and a control program.

The invention relates to an arrangement and a method for error monitoring of the control device wherein in particular the correct procedure of the control method implemented in the control device is monitored. As the result of the monitoring an output signal is generated with the aid of which an error treatment measure, for example through an accessory control, can be initiated. The invention is in particular directed toward the monitoring of sequences in digital computers or processors or microprocessors. It is here irrelevant whether or not the fault in the sequence is to be traced back to an error in the software, the hardware or also an error function due to absent or false input signals or due to a failure of the power supply of the control.

A comparable task is resolved in prior art (DE 3728561 C2) by installing a program stored in a microprocessor such that at regular intervals a signal is output which resets a counter. If one of the otherwise regularly output signals is output later than at a previously defined time, an error signal is generated through an external circuit which measures the length of time by means of a counter.

In such an arrangement it is however not possible to determine whether or not the program stored in the microprocessor is executed in the correct order. Thus program loops, which contain a corresponding check point for a signal output, can be cycled through an infinite number of times or the program steps with the associated check points can be passed through in the entirely false order without the monitoring unit 12 realizing such and being able to generate an error signal therefrom.

An important application in which especially high operational security is demanded is the use of control systems for the control of equipment assemblies in motor vehicles. Herein the steering arrangement, for example, plays an especially important role.

FIG. 1 depicts a schematic layout of a steering arrangement 129 with power-assist booster, which corresponds substantially to prior art. It is inter alia comprised of a steering wheel 120, a steering column 121, the steering gearing 122 and the two tie rods 124. The tie rods 124 are driven by a toothed steering rack 123. The power steering booster 127 formed of components, to be not further denoted here, serves for the power-assist booster. The steering arrangement 129 further includes a superposition device 100 for rotational speed superposition. Both devices are driven by a servomotor which is preferably electrically driven. The intention of the driver, customarily a rotational angle impressed by the driver onto the steering wheel and an impressed torque, is here fed as a signal 281 into a control device 10 through the steering wheel 120 via a (not shown) sensor circuitry. Preferred are individual or several further parameters, such as for example, but not limited to: travel speed, yaw rate, side-wind speed, state of loading of motor vehicle, roughness of the road, inclination of the motor vehicle as well as: angular position of the servomotor, measured current and voltage values, measured at the power supply of the servomotors and supplied as a signal into the control device 10. Depending on the embodiment, signals 280 are furthermore also supplied from the motor vehicle control system into the control device 10. In the control device 10 from the correspondingly supplied signal the corresponding control voltage 282 for the electromotor of the power steering booster 127 and the control voltage 282 of the drive for the rotational speed superposition device 100 is determined and output to the power steering booster 127 or the rotational speed superposition device 100. Herein a sensitive and fast regulation is required which permits a rigid steering system causing low inertia and intrinsic oscillation. For such systems a highly rigorous measure of failure security is necessary. Extremely small error functions in the control device can already lead to false steering angle deviations and therewith to accidents.

The error functions can herein be traceable to various causes. First, simply a failure of the on-board voltage, for example due to line or contact break, can lead to an abrupt interruption of the control function. In this case the superposition gearing of the rotational speed superposition device 100 must be bridged by means of a forced coupling and the steering interventions must be transferred from the steering wheel 120 directly onto the horizontal angular deviation of the wheels. A sensor error or sensor failure, further, can lead to erroneous calculation results in the control device and therewith to erroneous control signals for one or both servomotors. Such cases can also be intercepted through relatively simple sensor monitoring devices such that in the control device an appropriate emergency program can be triggered. The emergency measures can also simply consist merely in the output of an acoustic or optical signal as a warning to the driver.

A problem especially difficult of solution, however, consists in rapidly detecting error sequences in the control process of the control device 10 in order for appropriate error treatment measures, such as for example the forced bridging of the rotational speed superposition device 100 already mentioned above, is initiated. Error sequences in the system can be due to software as well as to hardware. An important problem represents also the temperature problem which can lead to function faults in parts, such as for example in the electronic processor circuits of the steering mechanism.

SUMMARY OF THE INVENTION

The invention addresses the problem of providing an arrangement and a method for the error monitoring of the control device, wherein in particular the correct sequence of the control method implemented in the control device, in particular of a program stored in the control device, is monitored for error function.

The problem is solved according to the invention through the arrangement according to the characteristics of claim 1, as well as according to the method according to claim 10. The dependent claims define further advantageous embodiment forms.

The control system according to the invention includes a control device with a processor and a control program which calculates from at least one measured value signal fed into the control device at least one set value signal operationally connected with a setting actuator, wherein at least at two predefined flow-gate points in the control program at least one check point (K) is defined, at which the control device outputs a program output value which forms a monitoring signal and outputs it to a monitoring device. The monitoring signal comprises at least two signal elements of three possible signal elements, wherein a first signal element represents the check point through which the control program should have passed immediately before the current check point and a second signal element which represents the current check point and a third signal element which represents the next intended check point in the program consecution, wherein the monitoring device tests the monitoring signal for their correct state and that a state signal is output as the error signal.

The problem is solved in particular through a control device with a control program stored therein, which calculates from at least one measured value signal fed into the control device at least one set value signal and outputs it to a setting actuator, wherein at least at two predefined flow-gate points in the control program check points are defined at which the control outputs a signal to a monitoring device and that the signal comprises at least two signal elements of three possible signal elements, wherein a first signal element represents the check point through which the control program should have passed immediately before the current check point, and a second signal element which represents the current check point, and a third signal element which represents the next intended check point in the program consecution, wherein the monitoring device outputs a digital or analog signal as the error message. The signal for the error message has herein two distinct levels or values, one for the state "error" and one for the state "no error". The proposed solution is applicable to all control programs and only requires two storage units, 2 comparator units, 1 OR-gate element, as well as the working storage for the embodiment of the operations in the comparators and in the OR-gate element.

The various features of novelty which characterize the invention are pointed out with particularity in the claims annexed to and forming a part of this disclosure and are entirely based on the priority applications PCT/CH2007/000110, filed Mar. 2, 2007 which designated the US and is incorporated herein by reference, and Swiss Application No. 549/06, filed Apr. 3, 2006.

BRIEF DESCRIPTION OF THE DRAWINGS

In the following the invention will be described by example with schematic figures. Therein depict.

DESCRIPTION OF THE PREFERRED EMBODIMENTS

Figure 1:
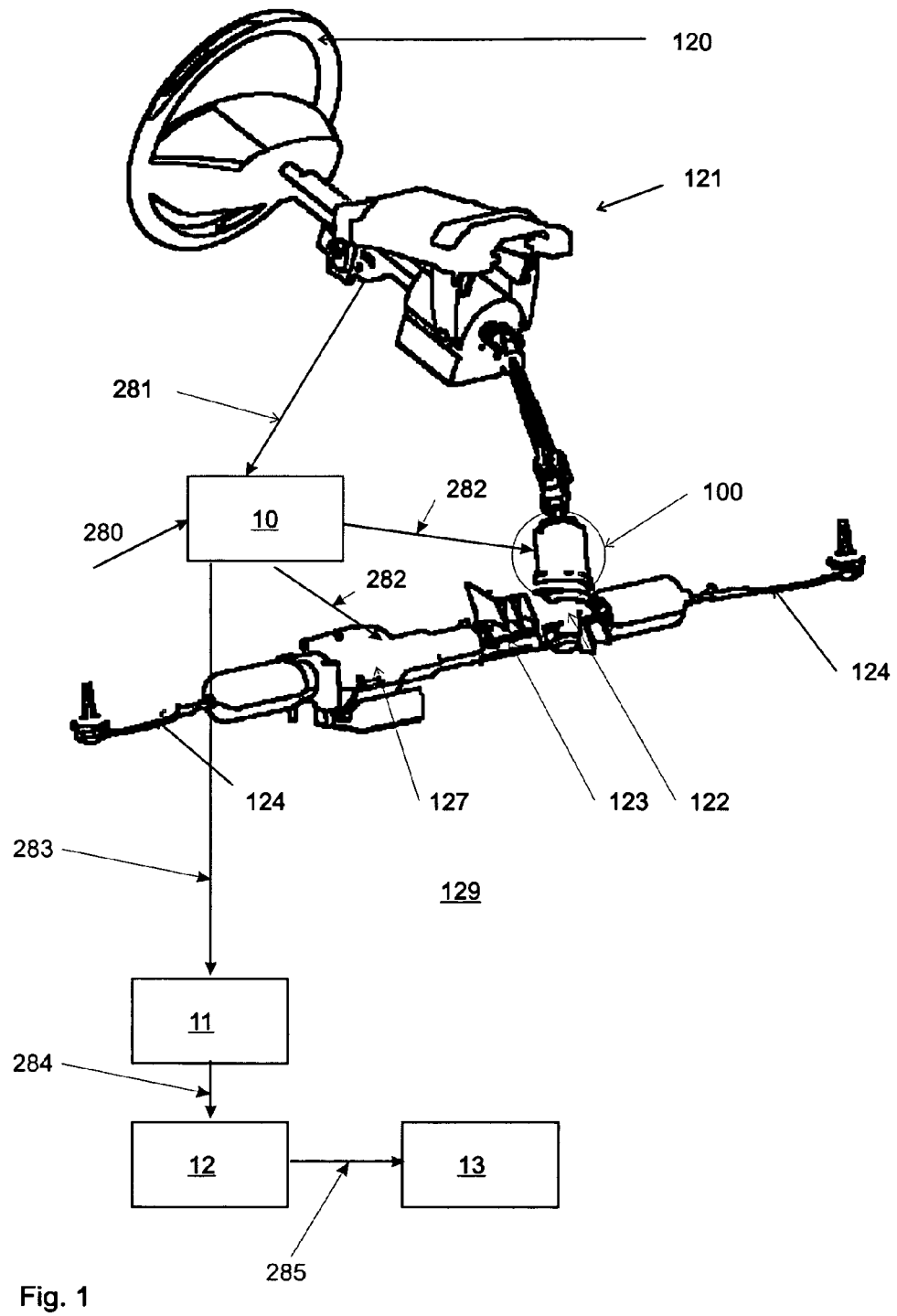
FIG. 1 the schematic layout of a steering arrangement 129 with power-assist booster, FIG. 2 a schematic representation of the hardware architecture and signal routing in the case of a non-branched program stage, FIG. 3 a schematic representation of the hardware architecture and signal routing in the case of a non-branched program stage corresponding to FIG. 2 for the case that the program pointer 20 has reached check point K1, FIG. 4 a schematic representation of the hardware architecture and signal routing in the case of a non-branched program stage corresponding to FIG. 2 for the case that the program pointer 20 has reached check point K2, FIG. 5 a schematic representation of the hardware architecture and signal routing in the case of a non-branched program stage corresponding to FIG. 2 for the case that the program pointer 20 does not pass through check point K2, FIG. 6 a schematic representation of the hardware architecture and signal routing in the case of a branched program stage, FIG. 7 a schematic representation of the hardware architecture and signal routing in the case of a branched program stage corresponding to FIG. 6 for the case that the program pointer 20 has reached check point K1, FIG. 8 a schematic representation of the hardware architecture and signal routing in the case of a branched program stage corresponding to FIG. 6 for the case that the program pointer 20 has reached check point K2, FIG. 9 a schematic representation of the hardware architecture and signal routing in the case of a branched program stage corresponding to FIG. 6 for the case that the program pointer 10 has reached check point K5 due to an error, circumventing one of check points K2, K3 or K4.

FIG. 1 shows schematically a preferred application of the invention in a steering arrangement 129 with power-assist booster for motor vehicles. It is inter alia comprised of a steering wheel 120, a steering column 121, the steering gearing 122 and the two tie rods 124. The tie rods 124 are driven by a toothed steering rack 123. For the power-assist booster serves the power steering booster 127, formed here of not further described components. The steering arrangement 129 comprises further a superposition device 100 for rotational speed superposition. Both devices are driven by a servomotor, preferably electrically driven. The driver's intention is herein through the steering wheel 120, conventionally the rotational angle and torque impressed by the driver onto the steering wheel, fed via a not shown sensor circuitry as a signal 281 into a control device 10. Preferably single or several further quantities to be measured, such as for example, but not limited to: traveling speed, yaw rate, side-wind speed, loading state of the motor vehicle, roughness of the road, inclination of the motor vehicle, as well as: angular position of the servomotors, measured current and voltage values, are measured at the power supply of the servomotors, and fed as a signal into the control device 10. Furthermore, depending on the embodiment, signals 280 are also fed from the motor vehicle control system, not shown here, into the control device 10. In the control device 10 from the correspondingly fed-in signals the corresponding control voltage is determined for the electromotor of the power steering booster 127 and the control voltage 282 of the drive for the rotational speed superposition device 100 and output to the power steering booster 127 or rotational speed superposition device 100, respectively.

To be able to detect reliably error functions in the system and in particular in the control sequence, program output values 283 are output to a processing device 11, which includes a signal output unit 14 which passes on a monitoring signal 284 to a monitoring device 12, wherein, according to certain criteria, the program consecution is tested in order to be able to output an error message 285 or an error signal in the event of an error condition. The error signal can be processed with a further control and trigger specific displays and/or safety measures.

The control system for error detection includes a control device 10 with a processor and a control program, which calculates from at least one measured value signal 281 fed into the control device 10 at least one set value signal 282 operationally connected with a setting actuator 100, 127, wherein at least at two predefined flow-gate points in the control program at least one check point (K) is defined, at which the control device 10 outputs a program output value 283, 284, which forms a monitoring signal 284 and outputs it to a monitoring device 12, wherein the monitoring signal 284 contains at least two signal elements 284a, b, c of three possible signal elements, wherein a first signal element 284a represents the check point (K1) through which the control program should have passed immediately before the current check point (K2) and a second signal element 284b, which represents the current check point and a third signal element 284c, which represents the next intended check point (K3) in the program consecution, wherein the monitoring device 12 tests the monitoring signals 284 for correct state and that a state signal can be output as error signal 285.

More than three signal elements 284 can per se also be utilized, which in this case can refer to check points located further back or further forward for a comparison. However, this would require significantly higher expenditures while providing only relatively low increases in security.

In the realization conventionally several hundred or even up to several thousand check points are set in the program consecution.

In a further development of the invention the error message 285 is output to a further control 13, which initiates appropriate emergency measures, for example the input and output shaft of a superposition gearing of a rotational speed superposition device 100 for a steering device 129 is forced-coupled by means of a coupling and therewith the rotational speed superposition 100 is bridged.

In a further development of the invention there is an additional test of whether a specified time had not been exceeded between the output of two successive monitoring signals 284 which had been sent, triggered by the control device 10 through the processing device 11, to the monitoring device 12.

In an additional further development of the invention there is an additional test of whether certain check points are reached within a specified time, and thus a time monitoring with a timer takes place.

As an example a control device is selected which comprises a digital computer or a processor, in which a control program is stored. Via appropriate analog-to-digital converters or digital-to-digital converters, which are not shown in the Figures, measurement signals 281 and signals 280 are introduced from the not shown motor vehicle control apparatus into the control device 10. Across further digital-to-analog converters or digital-to-digital converters, which are not shown in the Figures, the control device 10 sends setting signals 282 to the devices to be controlled by the control device, in the example here an electromotor of an electric servo steering booster 127 and to the electromotor of an electrically-assisted rotational speed superposition device 100.

The signal processing with the processing device 11, the monitoring unit 12 and optionally the further control 13 for the conditioning of the indication and/or emergency measures can all or also partially be developed in the form of programmed hardware, thus they can be contained in a further computer program. However, it is of advantage if these units 11, 12, 13, if possible, are developed in hardware as an electronic circuitry configuration, in order to increase the overall reliability.

Said inventive control concept can also be used in machine controls in which high reliability is required. Further preferred is also the use for the control of equipment assemblies in internal combustion machines or motor vehicles, such as for example for motor controls, variable stroke control of the gas control valves, driving of cam shaft adjusters and other actuators for variable stroke systems of internal combustion engines. It is especially preferred for use in steering systems, since here especially high operational security is demanded.

Figure 2:
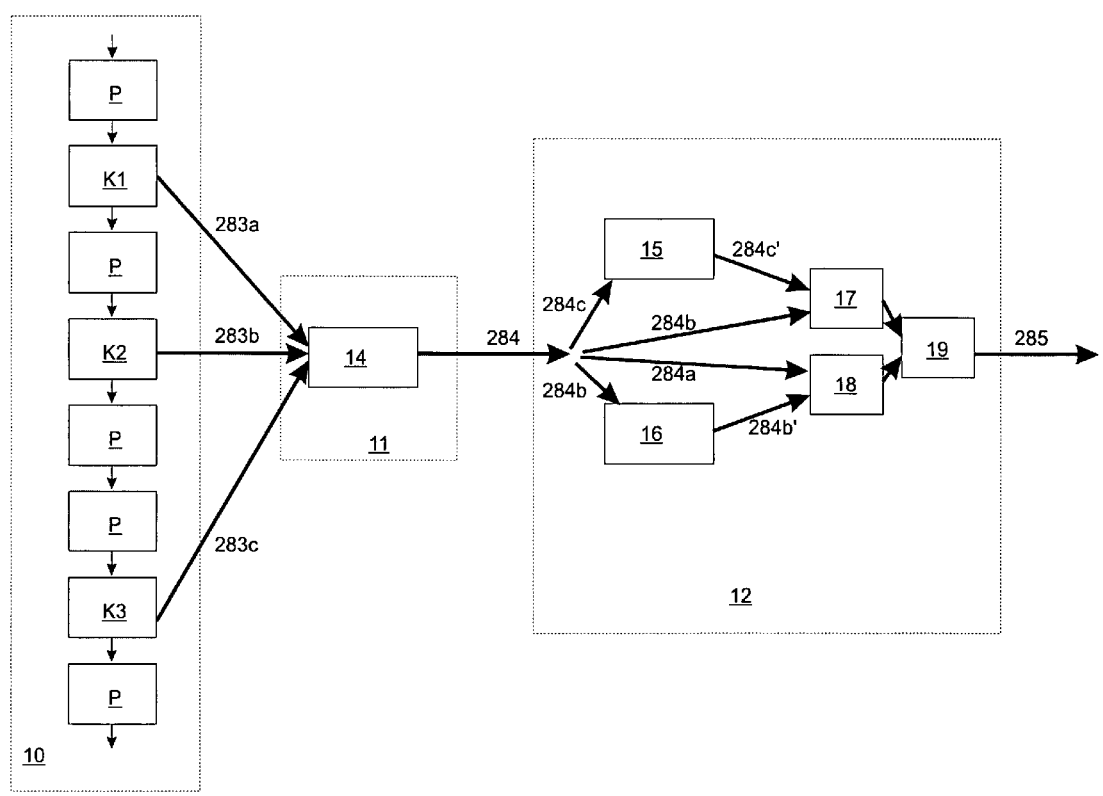
Figure 3:
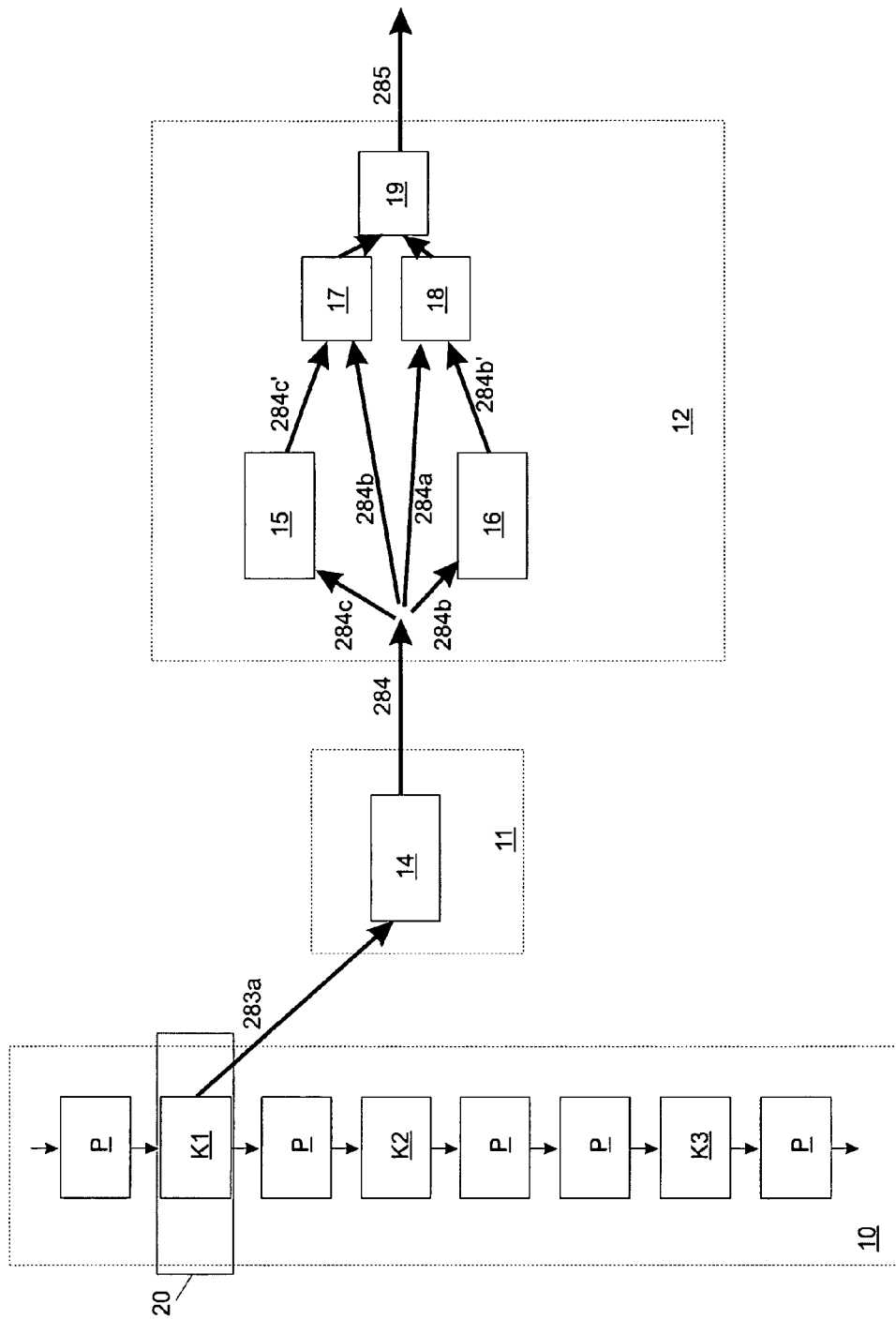
Figure 4:
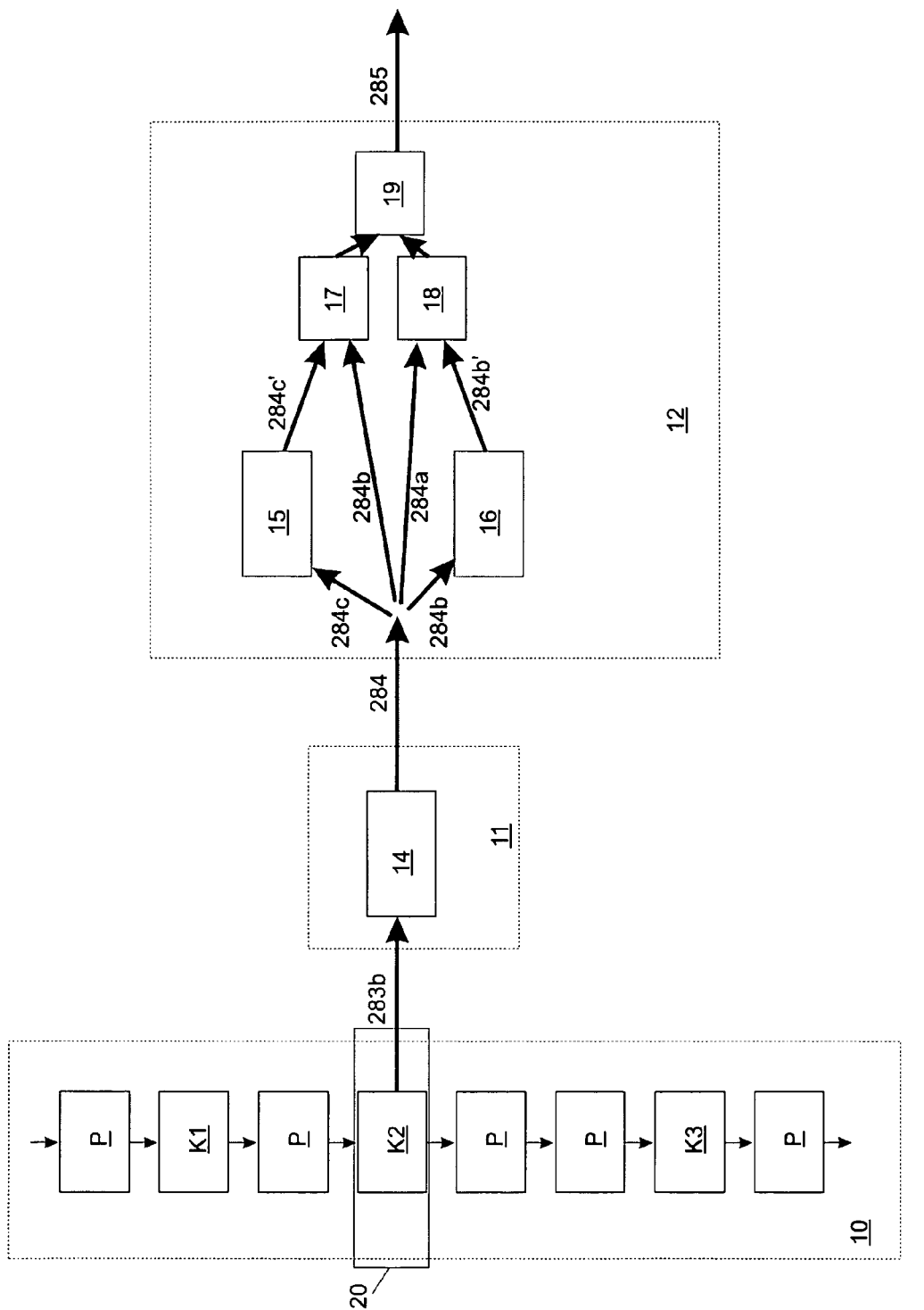
Figure 10:
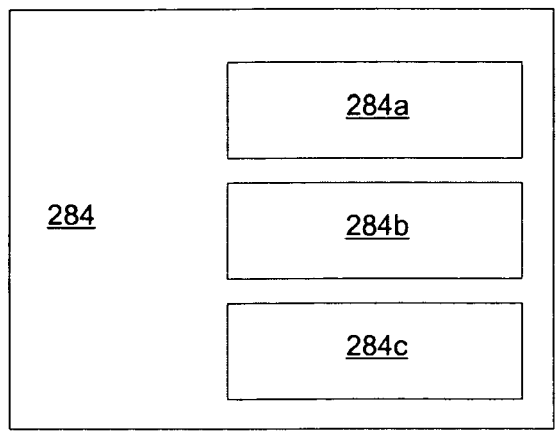
FIG. 10, 11, 12: layout of three different variants of the monitoring signal 284 which is fed into the monitoring device 12.
Figure 11:
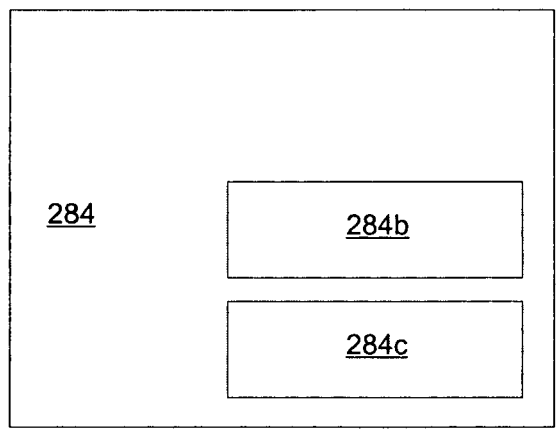
Figure 12:
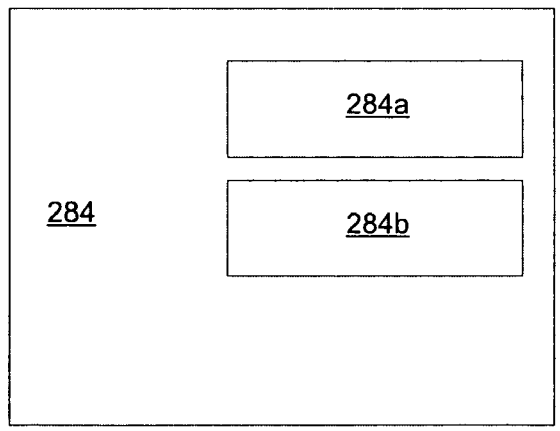

According to FIGS. 2, 3, 4 in the control device 10 is stored a program comprising a large number of program steps P, K1, K2, K3 which, triggered by a clock generator known in control technology, are sequentially passed through. It should be noted that a program step P can also be representative of a large number of program steps. In the Figures the program consecution is characterized by an arrow. In FIGS. 3 and 4 an instantaneous state of the program consecution, that is which program step is currently being carried out, is indicated by a program pointer 20. In the series of the program steps, special program steps, the check points K1, K2, K3, are integrated, which are passed through according to the program consecution. When the program pointer 20 arrives at one of the special program steps, a check point K1, K2, K3, from a program output value 283, 283a, 283b, 283c a digital signal 284 is generated in the processing device 11, which contains three signal elements 284a, 284b, and 284c, such as is shown schematically in FIGS. 10, 11, 12. To each check point is assigned the value triple for the signal elements: nominal value for the preceding check point 283a, actual value of the current check point 283b and nominal value for the succeeding check point 283c.

Each time a signal 284 arrives in the monitoring device, the content 284c' of a first store 15 is read out and supplied to a first comparator 17. Likewise, the signal element—current actual value of the check point 284b is supplied to the first comparator 17.

The content 284b' of a second store 16 is simultaneously read out and supplied to a second comparator 18. The signal element—nominal value of preceding check point 284a is likewise supplied to the second comparator 18.

Further, in the monitoring device 12 the signal element—nominal value for the next check value 283c is stored into the first store 15 and the signal element—actual value of the current check point 283b is stored into the second store 16.

In the two comparators 17 and 18 appropriate comparison operations are carried out whose result is "true" or "false". In the "OR-gate element" 19 the error signal 285 is generated which in the event both results are "false", the error signal 285 is set to the level or the value "error". In the case that at least one result is "true", the error signal 285 is set to the level or the value "no error".

Due to the succeeding sequence of the storage in the first store 15 and the second store 16, such as has been described above, therewith in the first comparator 17 the actual value of the currently reached check point 284b is compared with the nominal value for the check point now to be addressed, such as was deposited back in the preceding check point, 284c'. In contrast, in the second comparator 18 the actual value of the preceding check point 284b' is compared with the nominal value for the check point, which was deposited back as precursor in the current check point, 284a.

In the initialization of the program, appropriate dummy values are defined for the comparison for the preceding check point and stored in the two stores 15 and 16.

As an illustration in the following tabulated depictions, the signal contents of the signal elements 284a, 284b and 284c are set equivalent with the particular check points K1, K2, etc. In the following Table 1 are shown the contents of the stores and comparison operations, such as are generated in the sequence in FIGS. 3, 4 and 5.

Figure 5:
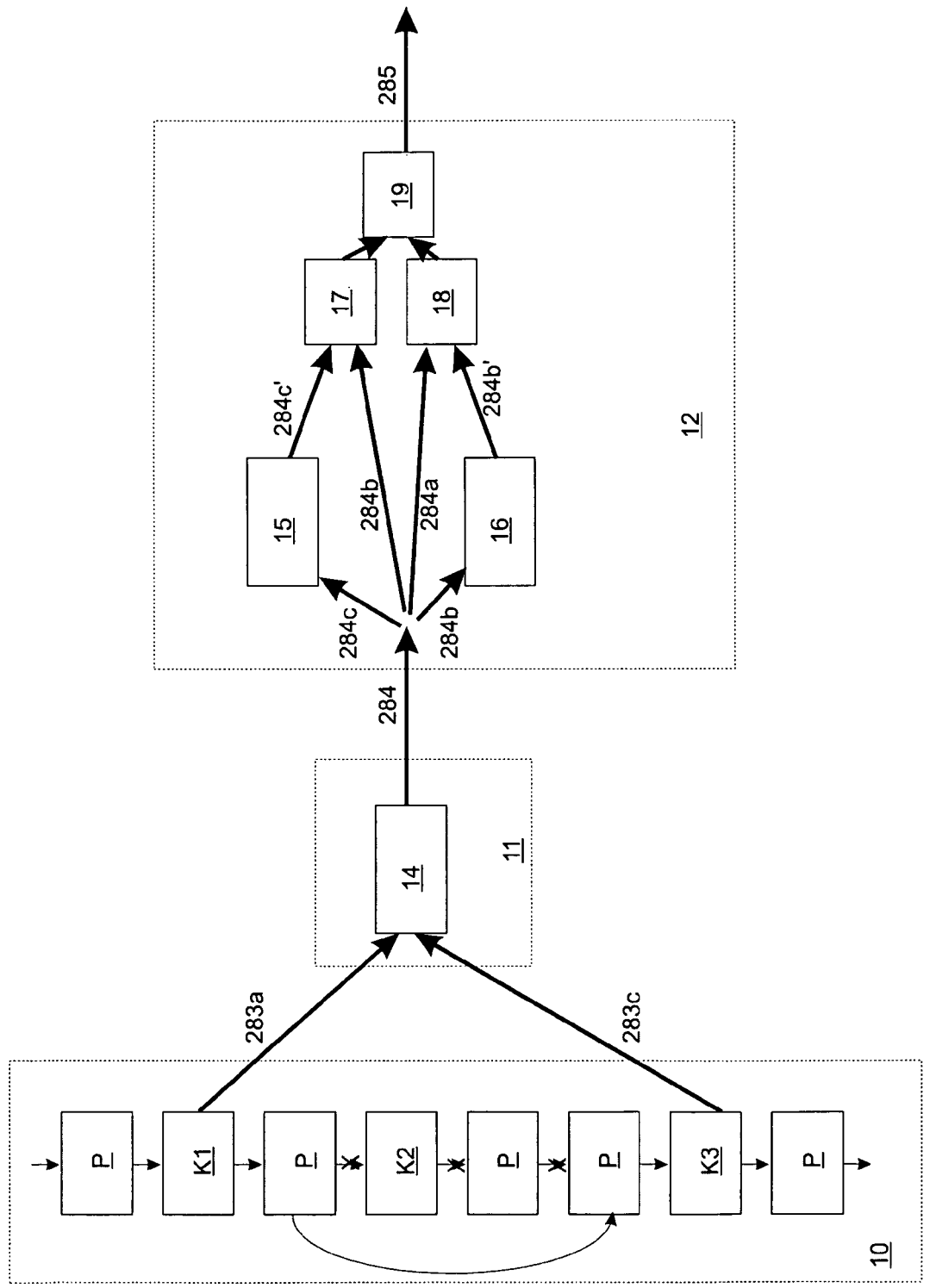

FIG. 5 shows the manner in which the program is executed not according to the intended sequence. The check point K2 is not reached. The monitoring device 12 detects accordingly an error when reaching the check point K3.

In the following Table 2 the sequence is shown such as is generated in a program consecution according to FIG. 5.

TABLE 1

| Program pointer at check point | Signal triple 284 | Store content before storage | Store content after storage | Values comapred in the comparator | Result | Error message |
|---|---|---|---|---|---|---|
| K1 | 284a: 0<br>284b: K1<br>284c: K2 | Store 15:<br>(284c')<br>K1 | Store 15:<br>K2 | Comparator 17:<br>(284c') (284b)<br>K1 = K1? | true | no error |
| | | Store 16:<br>(284b')<br>0 | Store 16:<br>K1 | Comparator 18:<br>(284a) (284b')<br>0 = 0? | true | |
| K2 | 284a: K1<br>284b: K2<br>284c: K3 | Store 15:<br>(284c')<br>K2 | Store 15:<br>K3 | Comparator 17:<br>(284c') (284b)<br>K2 = K2? | true | no error |
| | | Store 16:<br>(284b')<br>K1 | Store 16:<br>K2 | Comparator 18:<br>(284a) (284b')<br>K1 = K1? | true | |
| K3 | 284a: K2<br>284b: K3<br>284c: K4 | Store 15:<br>(284c')<br>K3 | Store 15:<br>K4 | Comparator 17:<br>(284c') (284b)<br>K3 = K3? | true | no error |
| | | Store 16:<br>(284b')<br>K2 | Store 16:<br>K3 | Comparator 18:<br>(284a) (284b')<br>K2 = K2? | true | |

TABLE 2

| Program pointer at check point | Signal triple 284 | Store content before storage | Store content after storage | Values compared in the comparator | Result | Error message |
|---|---|---|---|---|---|---|
| K1 | 284a: 0<br>284b: K1<br>284c: K2 | Store 15:<br>(284c')<br>K1 | Store 15:<br>K2 | Comparator 17:<br>(284c') (284b)<br>K1 = K1? | true | no error |
| | | Store 16:<br>(284b')<br>0 | Store 16:<br>K1 | Comparator 18:<br>(284a) (284b')<br>0 = 0? | true | |
| K3 | 284a: K2<br>284b: K3<br>284c: K4 | Store 15:<br>(284c')<br>K2 | Store 15:<br>K4 | Comparator 17:<br>(284c') (284b)<br>K2 = K3? | false | error |
| | | Store 16:<br>(284b')<br>K1 | Store 16:<br>K3 | Comparator 18:<br>(284a) (284b')<br>K2 = K1? | false | |

Figure 6:
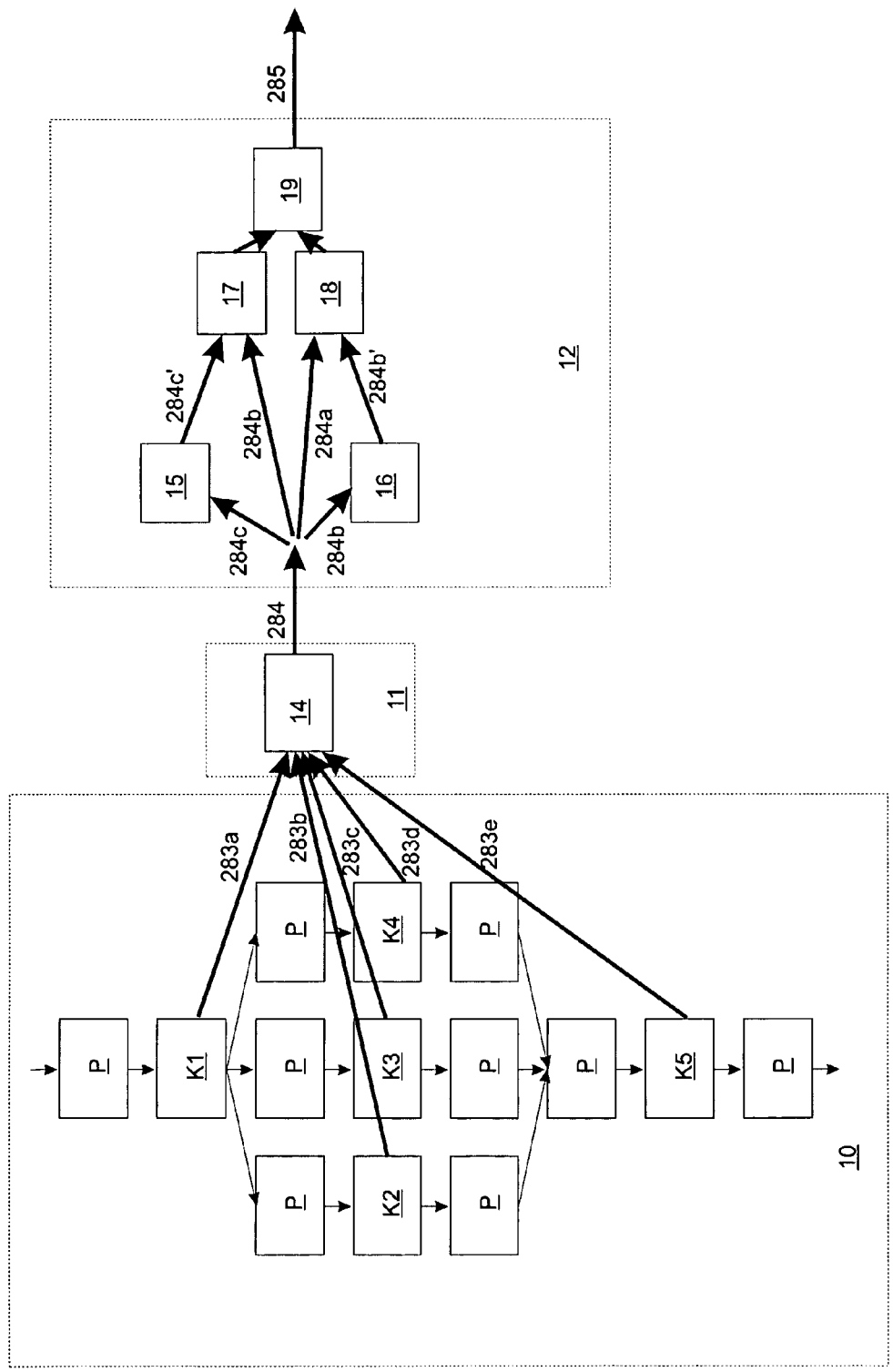
Figure 7:
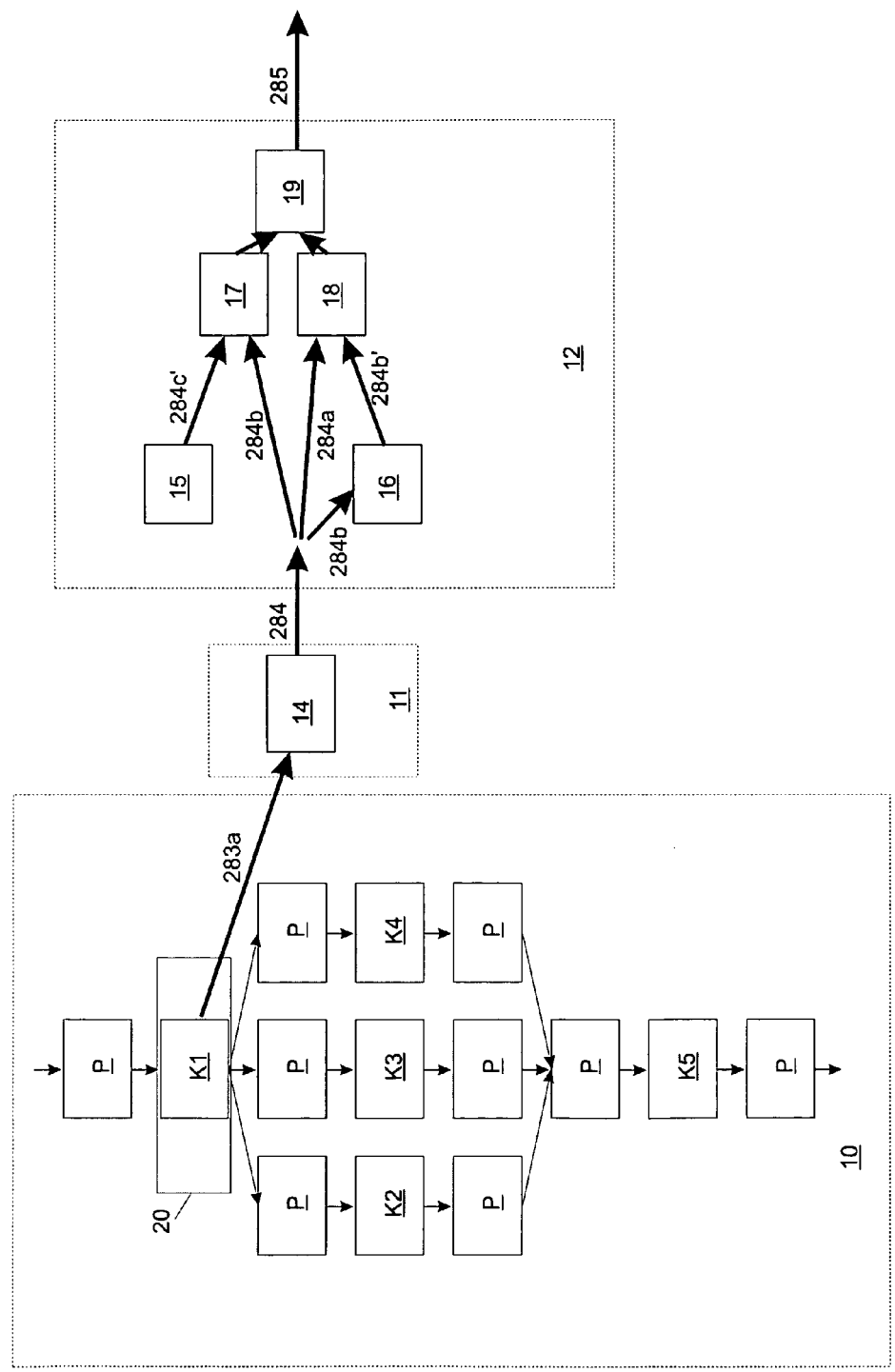
Figure 8:
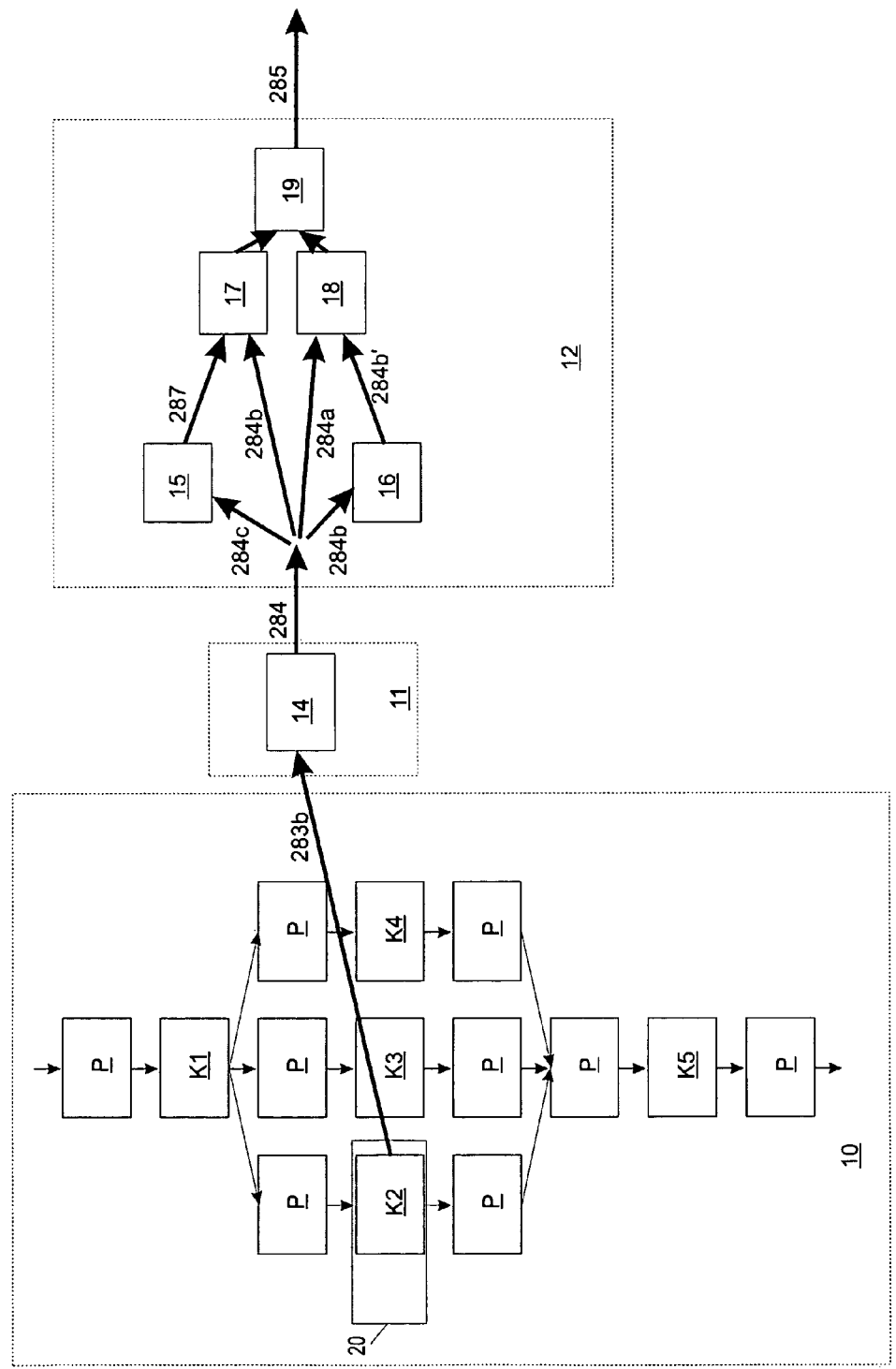

FIGS. 6, 7 and 8 depict a branched program consecution. This means that, for example, following the check point K1 one of the check points K2, K3 or K4 is permitted as the next following check point. Conversely, for example, one of the check points K2, K3 or K4 is permissible as the preceding check point of the check point K5. In such cases the monitoring signal—current nominal value of succeeding check point 284c or current nominal value of preceding check point 284a cannot be uniquely defined.

In a first embodiment form this ambiguous signal element of monitoring signal 284 is not sent with the monitoring signal 284. In the particular first or second store 15, 16 subsequently accordingly no value is stored such that an older fed-in value remains stored in it. In this case one of the two comparisons in one of the two comparators is responded to with "false". This variant is depicted in FIGS. 7 and 8, 9 as well as in FIGS. 11 and 12.

In a second embodiment form this ambiguous signal element of the monitoring signal 284 receives a wildcard value, for example "0". In this case one of the two comparisons in one of the two comparators is also responded to with "false".

Figure 9:
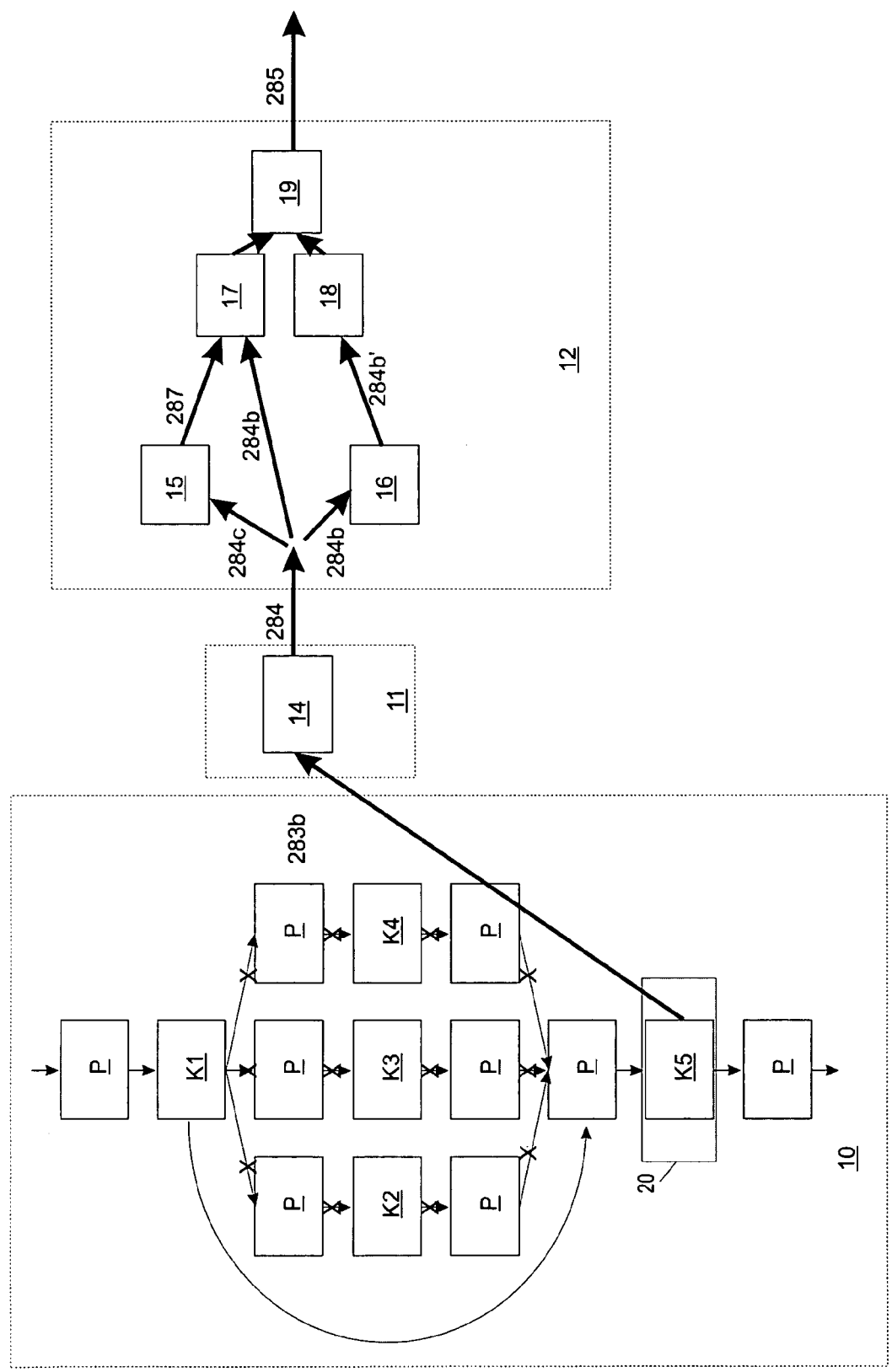

In FIGS. 8 and 9 as an example the signal contained in store 15 is referred to as "null signal" 287.

In the following Table 3 the sequence is shown such as is generated in a program consecution according to FIGS. 7 and 8.

TABLE 3

| Program pointer at check point | Signal triple 284 | Store content before storage | Store content after storage | Values comapred in the comparator | Result | Error message |
|---|---|---|---|---|---|---|
| K1 | 284a: 0<br>284b: K1<br>284c: 0 | Store 15:<br>(284c')<br>K1 | Store 15:<br>K1 | Comparator 17:<br>(284c') (284b)<br>K1 = K1? | true | no error |
| | | Store 16:<br>(284b')<br>0 | Store 16:<br>K1 | Comparator 18:<br>(284a) (284b')<br>0 = 0? | true | |
| K2 | 284a: K1<br>284b: K2<br>284c: K5 | Store 15:<br>(284c')<br>K1 | Store 15:<br>K5 | Comparator 17:<br>(284c') (284b)<br>K1 = K2? | false | no error |
| | | Store 16:<br>(284b')<br>K1 | Store 16:<br>K2 | Comparator 18:<br>(284a) (284b')<br>K1 = K1? | true | |

According to the depiction in FIG. 9, due to an error, the program consecution has advanced directly from check point K1 to the check point K5. The monitoring device 12 accordingly detects an error and consequently outputs the error message 285 with the value "error" upon reaching check point K5. This is illustrated in Table 4.

TABLE 4

| Program pointer at check point | Signal triple 284 | Store content before storage | Store content after storage | Values compared in the comparator | Result | Error message |
|---|---|---|---|---|---|---|
| K1 | 284a: 0<br>284b: K1<br>284c: 0 | Store 15:<br>(284c')<br>K1 | Store 15:<br>K1 | Comparator 17:<br>(284c') (284b)<br>K1 = K1? | true | no error |
|  |  | Store 16:<br>(284b')<br>0 | Store 16:<br>K1 | Comparator 18:<br>(284a) (284b')<br>0 = 0? | true |  |
| K5 | 284a: 0<br>284b: K5<br>284c: K6 | Store 15:<br>(284c')<br>K1 | Store 15:<br>K6 | Comparator 17:<br>(284c') (284b)<br>K1 = K5? | false | error |
|  |  | Store 16:<br>(284b')<br>K1 | Store 16:<br>K5 | Comparator 18:<br>(284a) (284b')<br>0 = K1? | false |  |

In Table 5 is shown the same sequence as in Table 4, if, before the check point K1, another check point K0 has also been passed through.

TABLE 5

| Program pointer at check point | Signal triple 284 | Store content before storage | Store content after storage | Values comapred in the comparator | Result | Error message |
|---|---|---|---|---|---|---|
| K0 | 284a: 0<br>284b: K0<br>284c: K1 | Store 15:<br>(284c')<br>K0 | Store 15:<br>K0 | Comparator 17:<br>(284c') (284b)<br>K0 = K0? | true | no error |
|  |  | Store 16:<br>(284b')<br>0 | Store 16:<br>K0 | Comparator 18:<br>(284a) (284b')<br>0 = 0? | true |  |
| K1 | 284a: K0<br>284b: K1<br>284c: 0 | Store 15:<br>(284c')<br>K0 | Store 15:<br>K0 | Comparator 17:<br>(284c') (284b)<br>K0 = K1? | false | no error |
|  |  | Store 16:<br>(284b')<br>K0 | Store 16:<br>K1 | Comparator 18:<br>(284a) (284b')<br>K0 = K0? | true |  |
| K5 | 284a: 0<br>284b: K5<br>284c: K6 | Store 15:<br>(284c')<br>K0 | Store 15:<br>K6 | Comparator 17:<br>(284c') (284b)<br>K0 = K5? | false | error |
|  |  | Store 16:<br>(284b')<br>K1 | Store 16:<br>K5 | Comparator 18:<br>(284a) (284b')<br>0 = K1? | false |  |

Reference is expressly made to the fact that the solution can be completely implemented in the program code itself as a "complete software solution" and only the error signal 285 itself is, for example, output by an appropriate output unit, such as is available, for example, as a plug-in card for computers.

The comparison operations, the storage operations and the OR-gate operation in the monitoring device 12 can in this case be reproduced within the software. Only the output of the result of the OR-gate operation as an electrical signal value would be realized through a hardware. This embodiment form is applied when the security of the control does not need to meet quite as extremely high requirements.

Depending on the required monitoring security, intermediate stages can be put into effect between the complete "software solution" and the solution shown in the examples.

The invention claimed is:

1. Method for monitoring a control program of a control system with a control device (10) with a processor and a control program which from at least one measured value signal (281) fed into the control device (10) calculates at least one set value signal (282) and outputs the value signal (282) to a setting actuator (100, 127), wherein at least at two predefined flow-gate points in the control program a check point (K) is defined at which the control device (10) outputs a program output value (283, 284), which forms a monitoring signal (284) and outputs the monitoring signal (284) to a monitoring device (12), characterized in that the check point (K) initiates output of a monitoring signal (284) which contains at least two signal elements (284a, b, c) of three possible signal elements, wherein a first signal element (284a) represents a first check point (K1) through which the control program is to have passed immediately before a current check point (K2), and a second signal element (284b) representing the current check point, and a third signal element (284c) which represents a third check point (K3) intended next in the program consecution, wherein the monitoring device (12) tests the monitoring signal (284) for the correct state of the monitoring signal (284) in that the third signal element (284c) is stored in a first store (15) and a signal (284c') read from the first store (15) is compared in a first comparator (17) with a current actual value signal (284b) of the current check point (K2) and simultaneously a second signal element (284b) is stored in a second store (16) and a signal (284b') read from the second store (16) is compared in a second comparator (18) with the first signal element (284a) of the first check point (K1) and that the two output signals of the comparators (17,

18) are linked with an OR-gate element which generates a state signal and, in the event of an error function of the program consecution, outputs an error signal (285).

2. Method as claimed in claim 1, characterized in that the error signal (285) is set to a predetermined level or value for the state "error" if both comparison operations arrive at the result "false", while the error signal is set to the predetermined level for the state "no error" if one of the two comparison operations arrives at the result "true".

3. Method as claimed in claim 1, characterized in that the monitoring device (12) and the control device (10) are connected across a processing device (11) with which the processing of the program output values takes place.

4. Method as claimed in claim 1, characterized in that the monitoring signal (284) in the monitoring device (12) or in a processing device (11) are processed in an electronic circuit.

5. Method as claimed in claim 1, characterized in that the error signal (285) is supplied to a further control (13) which, as emergency control, brings about emergency measures on equipment assemblies of machines.

6. Method as claimed claim 1, characterized in that the time between two successive monitoring signals (284) which, triggered by the control device (10), had been sent to processing device (11) and to the monitoring device (12), is monitored and outputs as the error signal (285), if a predeterminable time interval is exceeded, a signal assigned to the value "error".

7. Method as claimed in claim 1, characterized in that the control system is utilized as machine control or as control for equipment assemblies in a motor vehicle.

8. Method as claimed in claim 1, characterized in that the monitoring signal (284) in the monitoring device (12) or in a processing device (11) are processed at least partially in an electronic circuit.

9. Method as claimed in claim 1, characterized in that the error signal (285) is supplied to a further control (13) which, as emergency control, brings about emergency measures on equipment assemblies of motor vehicle steering systems.

10. Method as claimed in claim 1, characterized in that the control system is utilized as control for equipment assemblies in a motor vehicle to secure control of a steering arrangement.

* * * * *

UNITED STATES PATENT AND TRADEMARK OFFICE
CERTIFICATE OF CORRECTION

PATENT NO. : 8,160,779 B2
APPLICATION NO. : 12/294537
DATED : April 17, 2012
INVENTOR(S) : Zoltan Thimar Page 1 of 1

It is certified that error appears in the above-identified patent and that said Letters Patent is hereby corrected as shown below:

Title page Item [73] should read

-- (73) Assignee: ThyssenKrupp Presta AG, Eschen (LI) --

Signed and Sealed this
Third Day of July, 2012

David J. Kappos
*Director of the United States Patent and Trademark Office*